US012525667B2

(12) United States Patent
Omura

(10) Patent No.: US 12,525,667 B2
(45) Date of Patent: Jan. 13, 2026

(54) BATTERY MODULE

(71) Applicant: PRIME PLANET ENERGY & SOLUTIONS, INC., Tokyo (JP)

(72) Inventor: Tetsuji Omura, Kobe (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 645 days.

(21) Appl. No.: 18/147,150

(22) Filed: Dec. 28, 2022

(65) Prior Publication Data

US 2023/0253648 A1 Aug. 10, 2023

(30) Foreign Application Priority Data

Feb. 9, 2022 (JP) ................................. 2022-018810

(51) Int. Cl.
*H01M 10/6556* (2014.01)
*H01M 10/613* (2014.01)
*H01M 10/6555* (2014.01)
*H01M 50/209* (2021.01)

(52) U.S. Cl.
CPC ..... *H01M 10/6556* (2015.04); *H01M 10/613* (2015.04); *H01M 10/6555* (2015.04); *H01M 50/209* (2021.01)

(58) Field of Classification Search
CPC ........... H01M 10/6556; H01M 10/613; H01M 10/6555; H01M 50/209
See application file for complete search history.

(56) References Cited

U.S. PATENT DOCUMENTS

| 2012/0177960 | A1 | 7/2012 | Tasai et al. |
| 2012/0315529 | A1 | 12/2012 | Jin |
| 2014/0011059 | A1* | 1/2014 | Hashimoto ............. B60L 1/003 429/72 |
| 2014/0295241 | A1 | 10/2014 | Tao et al. |
| 2018/0183117 | A1 | 6/2018 | Cho et al. |

(Continued)

FOREIGN PATENT DOCUMENTS

| CN | 107534196 B * | 3/2020 | .......... H01M 10/613 |
| DE | 10 2018133391 A1 | 6/2019 | |

(Continued)

OTHER PUBLICATIONS

Machine Translation of JP-5147373-B2 (Oct. 26, 2025) (Year: 2025).*

(Continued)

*Primary Examiner* — Matthew J Merkling
(74) *Attorney, Agent, or Firm* — Finnegan, Henderson, Farabow, Garrett and Dunner, LLP

(57) ABSTRACT

A battery module includes: a plurality of battery cells each including a bottom surface, the plurality of battery cells being arranged in a first direction; a cooling plate facing the bottom surface of each of the plurality of battery cells; and a heat conduction member provided between each of the plurality of battery cells and the cooling plate. The cooling plate has a protrusion and a recess at a portion facing the bottom surface of each of the plurality of battery cells. The heat conduction member is sandwiched between the protrusion of the cooling plate and the bottom surface of each of the plurality of battery cells, and is provided to be located in the recess of the cooling plate.

13 Claims, 5 Drawing Sheets

(56) References Cited

U.S. PATENT DOCUMENTS

| | | |
|---|---|---|
| 2019/0198952 A1 | 6/2019 | Choi et al. |
| 2021/0376401 A1 | 12/2021 | Ando |
| 2022/0278387 A1 | 9/2022 | Takata et al. |
| 2023/0275312 A1* | 8/2023 | Egashira ............ H01M 10/4207 |
| 2025/0174751 A1* | 5/2025 | Fujimura ............ H01M 10/653 |

FOREIGN PATENT DOCUMENTS

| | | | | |
|---|---|---|---|---|
| JP | 2009-016285 A | 1/2009 | | |
| JP | 2011-023296 A | 2/2011 | | |
| JP | 2012-156124 A | 8/2012 | | |
| JP | 5147373 B2 * | 2/2013 | ......... | H01M 50/291 |
| JP | 2014-192010 A | 10/2014 | | |
| JP | 2015-022830 A | 2/2015 | | |
| JP | 5985255 B2 * | 9/2016 | | |
| JP | 2018-522373 A | 8/2018 | | |
| JP | 2018-147607 A | 9/2018 | | |
| JP | 2019-216023 A | 12/2019 | | |
| JP | 2020-009672 A | 1/2020 | | |
| JP | 2020-053148 A | 4/2020 | | |
| WO | WO-2012133709 A1 * | 10/2012 | ......... | H01M 50/249 |
| WO | WO 2021/024776 A1 | 2/2021 | | |
| WO | WO-2021070478 A1 * | 4/2021 | ......... | H01M 50/264 |

OTHER PUBLICATIONS

Machine Translation of JP-5985255-B2 (Oct. 26, 2025) (Year: 2025).*

Machine Translation of WO-2012133709-A1 (Oct. 26, 2025) (Year: 2025).*

Machine Translation of CN-107534196-B (Oct. 26, 2025) (Year: 2025).*

* cited by examiner

BATTERY MODULE

This nonprovisional application is based on Japanese Patent Application No. 2022-018810 filed on Feb. 9, 2022 with the Japan Patent Office, the entire contents of which are hereby incorporated by reference.

BACKGROUND OF THE INVENTION

Field of the Invention

The present technology relates to a battery module.

Description of the Background Art

Attempts have been made to improve cooling efficiency of a battery module. For example, Japanese Patent Laying-Open No. 2015-22830 discloses a battery assembly provided with a bracket that presses a cooling plate from its bottom surface side to the case side.

Further, Japanese Patent Laying-Open No. 2009-16285 discloses to provide a cooling plate with irregularities for forming a cooling path.

SUMMARY OF THE INVENTION

It is required to improve efficiency of heat conduction from a battery cell to a cooling plate. On the other hand, it is also required to downsize a battery module. From a viewpoint of satisfying both of these requirements, the conventional battery module still has room for improvement.

It is an object of the present technology to provide a battery module to promote downsizing as well as heat conduction from a battery cell to a cooling plate.

A battery module according to the present technology includes: a plurality of battery cells each including a bottom surface, the plurality of battery cells being arranged in a first direction; a cooling plate facing the bottom surface of each of the plurality of battery cells; and a heat conduction member provided between each of the plurality of battery cells and the cooling plate. The cooling plate has a protrusion and a recess at a portion facing the bottom surface of each of the plurality of battery cells. The heat conduction member is sandwiched between the protrusion of the cooling plate and the bottom surface of each of the plurality of battery cells, and is provided to be located in the recess of the cooling plate.

The foregoing and other objects, features, aspects and advantages of the present invention will become more apparent from the following detailed description of the present invention when taken in conjunction with the accompanying drawings.

Figure 1:
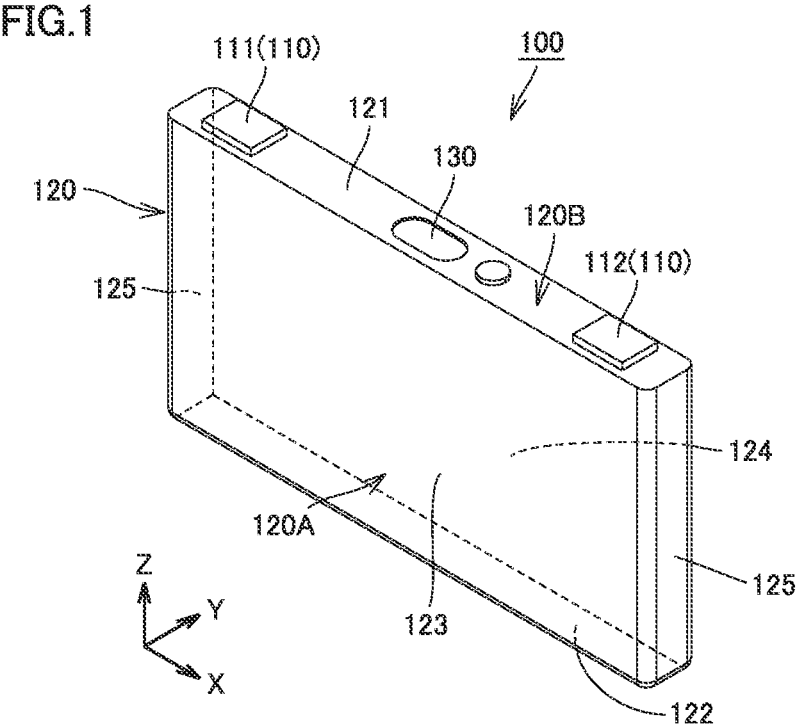
FIG. 1 is a perspective view showing a battery cell.

Each of FIGS. 7 to 11 is a diagram showing a modification of shapes of protrusions and recesses.

DESCRIPTION OF THE PREFERRED EMBODIMENTS

Hereinafter, embodiments of the present technology will be described. It should be noted that the same or corresponding portions are denoted by the same reference characters, and may not be described repeatedly.

It should be noted that in the embodiments described below, when reference is made to number, amount, and the like, the scope of the present technology is not necessarily limited to the number, amount, and the like unless otherwise stated particularly. Further, in the embodiments described below, each component is not necessarily essential to the present technology unless otherwise stated particularly. Further, the present technology is not limited to one that necessarily exhibits all the functions and effects stated in the present embodiment.

It should be noted that in the present specification, the terms "comprise", "include", and "have" are open-end terms. That is, when a certain configuration is included, a configuration other than the foregoing configuration may or may not be included.

Also, in the present specification, when geometric terms and terms representing positional/directional relations are used, for example, when terms such as "parallel", "orthogonal", "obliquely at 45°", "coaxial", and "along" are used, these terms permit manufacturing errors or slight fluctuations. In the present specification, when terms representing relative positional relations such as "upper side" and "lower side" are used, each of these terms is used to indicate a relative positional relation in one state, and the relative positional relation may be reversed or turned at any angle in accordance with an installation direction of each mechanism (for example, the entire mechanism is reversed upside down).

In the present specification, the term "battery" is not limited to a lithium ion battery, and may include other batteries such as a nickel-metal hydride battery and a sodium ion battery.

In the present specification, the "battery cell" can be mounted on vehicles such as a hybrid electric vehicle (HEV), a plug-in hybrid electric vehicle (PHEV), and a battery electric vehicle (BEV). It should be noted that the use of the "battery cell" is not limited to the use in a vehicle.

FIG. 1 is a perspective view showing a battery cell 100. As shown in FIG. 1, battery cell 100 is a prismatic secondary battery cell having a prismatic shape. Battery cell 100 has electrode terminals 110, a housing 120, and a gas-discharge valve 130.

Electrode terminals 110 are formed on housing 120. Electrode terminals 110 have a positive electrode terminal 111 and a negative electrode terminal 112 arranged side by side along an X axis direction (second direction) orthogonal to a Y axis direction (first direction). Positive electrode terminal 111 and negative electrode terminal 112 are provided to be separated from each other in the X axis direction.

Housing 120 has a rectangular parallelepiped shape and forms an external appearance of battery cell 100. Housing 120 includes: a case body 120A that accommodates an electrode assembly (not shown) and an electrolyte solution (not shown); and a sealing plate 120B that seals an opening of case body 120A. Sealing plate 120B is joined to case body 120A by welding.

Housing 120 has an upper surface 121, a lower surface 122 (bottom surface), a first side surface 123, a second side surface 124, and two third side surfaces 125.

Upper surface 121 is a flat surface orthogonal to the Y axis direction and a Z axis direction (third direction) orthogonal to the X axis direction. Electrode terminals 110 are disposed on upper surface 121. Lower surface 122 faces upper surface 121 along the Z axis direction.

Each of first side surface 123 and second side surface 124 is constituted of a flat surface orthogonal to the Y axis direction. Each of first side surface 123 and second side surface 124 has the largest area among the areas of the plurality of side surfaces of housing 120. Each of first side surface 123 and second side surface 124 has a rectangular shape when viewed in the Y axis direction. Each of first side surface 123 and second side surface 124 has a rectangular shape in which the X axis direction corresponds to the long-side direction and the Z axis direction corresponds to the short-side direction when viewed in the Y axis direction.

A plurality of battery cells 100 are stacked (arranged) such that first side surfaces 123 of battery cells 100, 100 adjacent to each other in the Y direction face each other and second side surfaces 124 of battery cells 100, 100 adjacent to each other in the Y axis direction face each other. Thus, positive electrode terminals 111 and negative electrode terminals 112 are alternately arranged in the Y axis direction in which the plurality of battery cells 100 are stacked.

Gas-discharge valve 130 is provided in upper surface 121. When the temperature of battery cell 100 is increased (thermal runaway) and internal pressure of housing 120 becomes more than or equal to a predetermined value due to gas generated inside housing 120, gas-discharge valve 130 discharges the gas to outside of housing 120.

Figure 2:
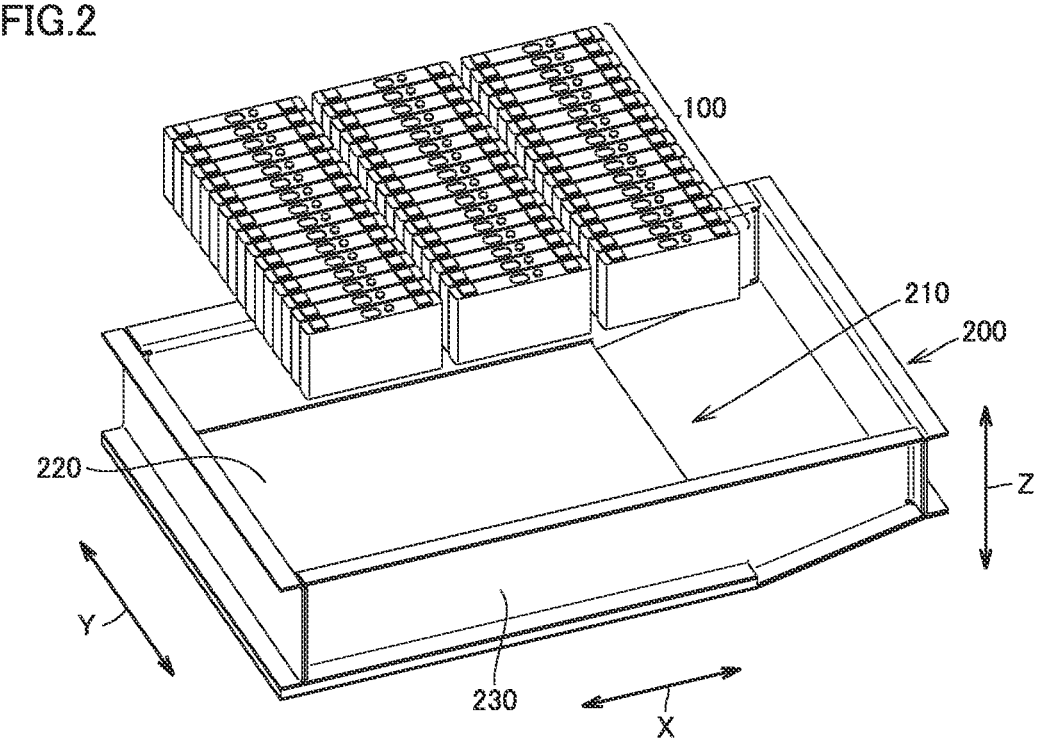
FIG. 2 is a perspective view showing battery cells and a case member that accommodates the battery cells.

FIG. 2 is a perspective view showing a case member 200 that accommodates battery cells 100. In FIG. 2, for convenience of illustration, a below-described cover portion of case member 200 is not shown.

As shown in FIG. 2, case member 200 includes an inner space 210, a cooling plate 220, and a side surface portion 230.

Inner space 210 accommodates stacks (battery assemblies) of the plurality of battery cells 100 stacked in the Y axis direction. The battery assemblies are arranged in three rows in the X axis direction. Cooling plate 220 and side surface portion 230 define inner space 210. Cooling plate 220 constitutes a bottom portion of case member 200.

Side surface portion 230 includes: portions each extending in a direction orthogonal to the Y axis direction; and portions each extending in a direction orthogonal to the X axis direction. Side surface portion 230 located on both sides in the Y axis direction with respect to the stacks of battery cells 100 (including separators) and extending in the direction orthogonal to the Y axis direction may directly support the stacks of battery cells 100 (Cell-to-Pack structure) or may accommodate a battery module including the plurality of battery cells 100 (Cell-Module-Pack structure).

Figure 3:
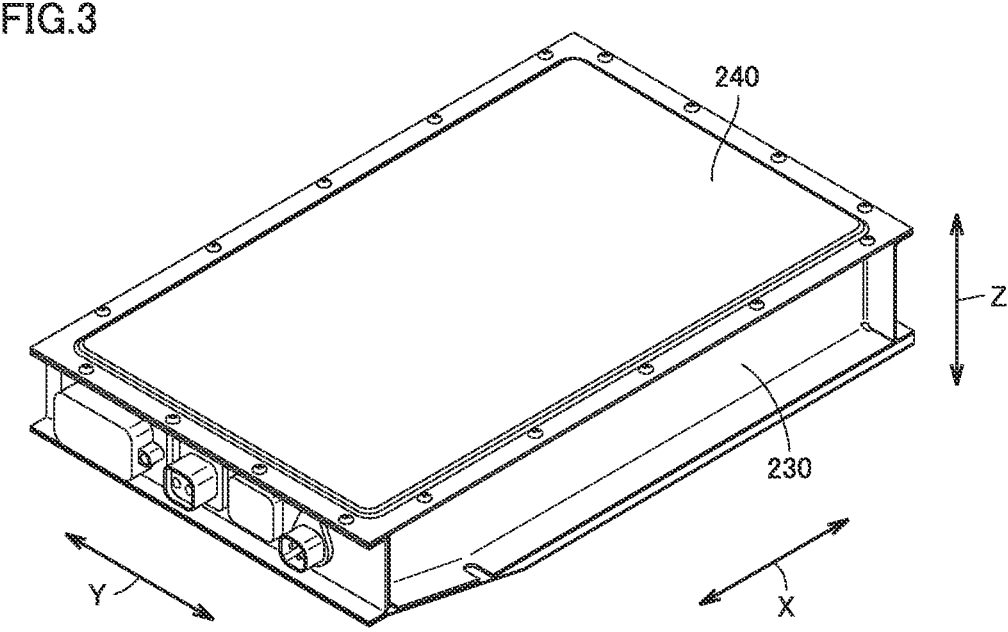
FIG. 3 is an external view of a battery pack.

FIG. 3 is an external view of a battery pack. As shown in FIG. 3, a cover member 240 is assembled to side surface portion 230 to seal inner space 210 of case member 200.

Figure 4:
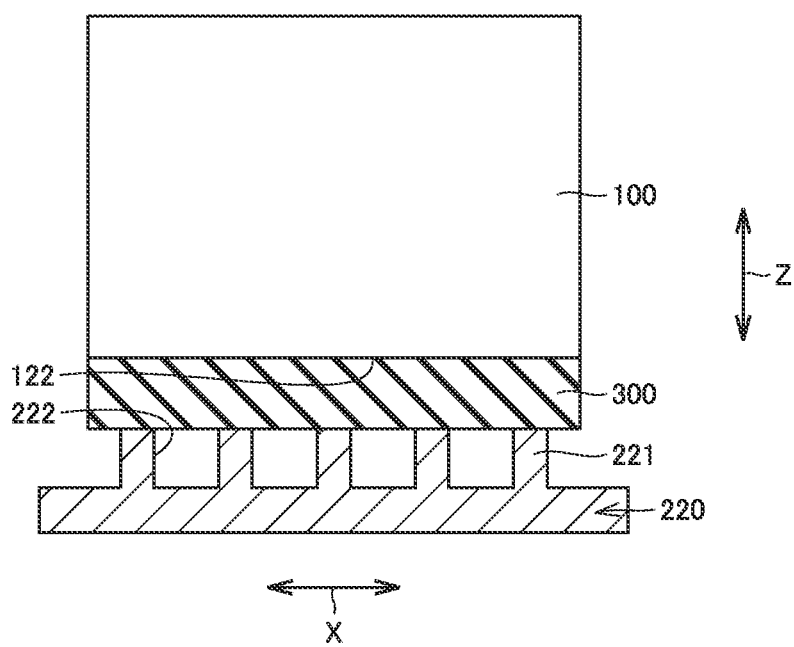
FIG. 4 is a diagram showing a state in which a heat conduction member is disposed between the battery cell and a cooling plate.
Figure 5:
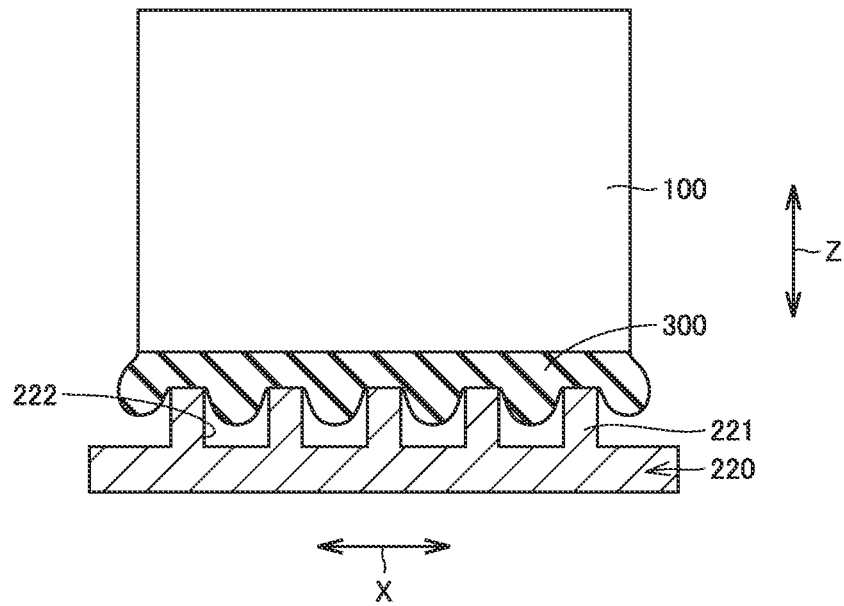
FIG. 5 is a diagram showing a state in which the heat conduction member is compressed from the state shown in FIG. 4.

FIG. 4 is a diagram showing a state in which heat conduction member 300 is disposed between battery cell 100 and cooling plate 220. FIG. 5 is a diagram showing a state in which heat conduction member 300 is compressed from the state shown in FIG. 4.

As shown in FIG. 4, heat conduction member 300 is provided between battery cell 100 and cooling plate 220. Cooling plate 220 has protrusions 221 and recesses 222. Protrusions 221 and recesses 222 are provided at a surface of cooling plate 220 facing heat conduction member 300. That is, protrusions 221 and recesses 222 are provided at a portion of cooling plate 220 facing lower surface 122 of battery cell 100. Heat conduction member 300 is sandwiched between protrusions 221 of cooling plate 220 and lower surfaces 122 of the plurality of battery cells 100, and is compressed between protrusions 221 and lower surfaces 122. As a result, as shown in FIG. 5, portions of heat conduction member 300 are brought to be located in recesses 222 of cooling plate 220. On this occasion, heat conduction member 300 is located in each of recesses 222 with a space being left in recess 222.

Heat conduction member 300 may include a material having heat conductivity improved by blending a resin such as a silicone resin, an acrylic resin, or an epoxy resin with a metal filler such as copper or aluminum, or by blending the resin with a ceramic filler such as alumina or silica with an emphasis being put on an insulating property. The heat conductivity of heat conduction member 300 is, for example, about 0.5 W/m·K or more and 8.0 W/m·K or less.

As an example, heat conduction member 300 may be composed of a sheet member having elasticity. Examples of the sheet member usable herein include: "SARCON" (heat conductivity: about 0.9 W/m·K or more and 3.4 W/m·K or less) provided by Fuji Polymer Industries; "Thermal interface silicone rubber" (heat conductivity: about 0.9 W/m·K or more and 7.3 W/m·K or less) provided by Shin-Etsu Silicone; "Thermal conductive sheet" (heat conductivity: about 1 W/m·K or more and 7 W/m·K or less) provided by Dexerials; and the like.

As another example, heat conduction member 300 may be composed of a curable type heat-conductive adhesive material. Examples of the heat-conductive adhesive material usable herein include "Scotch-Weld" (heat conductivity about 1.6 W/m·K) provided by 3M; "Thermal conductive adhesive" (heat conductivity: about 1.7 W/m·K or more and 2.1 W/m·K or less) provided by CEMEDINE; "Thermal interface RTV rubber" (heat conductivity: about 2.4 W/m·K) provided by Shin-Etsu Chemical, and the like.

In the example of FIGS. 4 and 5, protrusions 221 and recesses 222 of cooling plate 220 extend along the Y axis direction. However, protrusions 221 and recesses 222 may extend in the X axis direction, or may extend in an oblique direction intersecting the X axis direction and the Y axis direction. Further, protrusions 221 and/or recesses 222 may be formed in the form of a lattice or in the form of islands.

Figure 6:
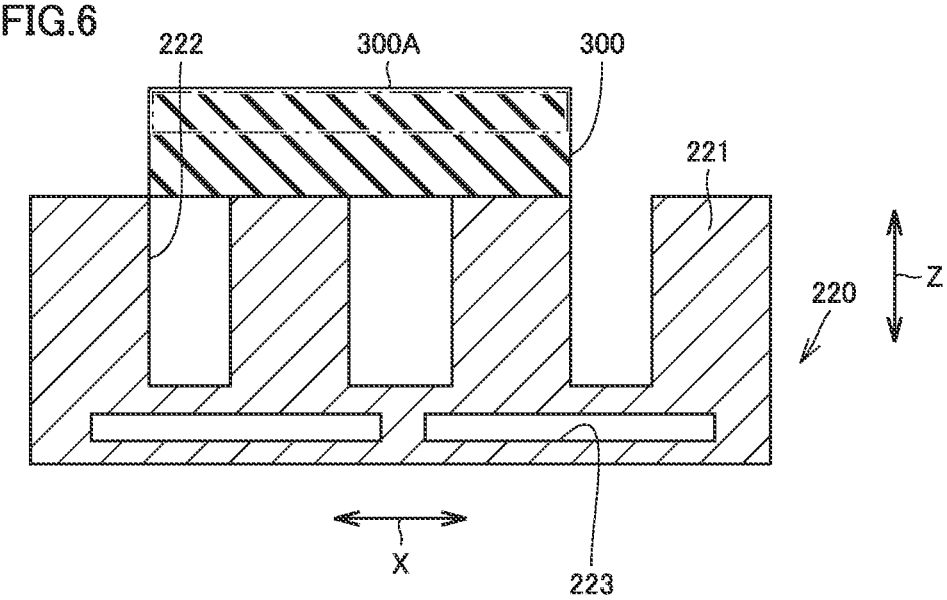
FIG. 6 is a diagram for illustrating details of structures of the cooling plate and the heat conduction member.

FIG. 6 is a diagram for illustrating details of structures of cooling plate 220 and heat conduction member 300. As shown in FIG. 6, coolant paths 223 are formed in cooling plate 220. Coolant paths 223 extend along the Y axis direction. That is, in cooling plate 220, protrusions 221 and recesses 222 extend in parallel with coolant paths 223. In this way, cooling plate 220 can be composed of an extruded material. In a typical example, cooling plate 220 is composed of an aluminum extruded material.

It should be noted that protrusions 221 and recesses 222 may extend in a direction different from that of coolant paths 223. Further, cooling plate 220 is not limited to the one composed of an extruded material, and protrusions 221, recesses 222, and coolant paths 223 may be formed by machining.

Heat conduction member 300 is compressed between lower surface 122 of housing 120 of battery cell 100 and each protrusion 221 of cooling plate 220. For example, heat conduction member 300 having a volume corresponding to a compressed portion 300A shown in FIG. 6 is brought to be located in recess 222. As an example, the width of protrusion 221 in the X axis direction is about 10 mm, for example. The volume of each recess 222 that receives deformed heat conduction member 300 is about 30% or more of the volume of protrusion 221. Deformed heat conduction member 300 is brought into close contact with lower surface 122 of housing 120 of battery cell 100 and cooling plate 220. With heat conduction member 300, heat conduction from battery cell 100 to cooling plate 220 is promoted, thereby improving cooling efficiency of battery cell 100.

If a flat cooling plate 220 provided with no protrusion 221 and no recess 222 is used, heat conduction member 300 cannot be necessarily deformed sufficiently and therefore size tolerance cannot be absorbed, with the result that the following situation may be resulted: cooling plate 220 is insufficiently fixed; heat conduction member 300 is insufficiently close contact with battery cell 100; or the like. On the other hand, when compressive force is applied to heat conduction member 300 to such an extent that size tolerance can be securely absorbed, the following situation may be resulted a mechanism is increased in size as a whole of the battery module; or size variation in the whole of the battery module is large.

To address these, in the battery module according to the present embodiment, heat conduction member 300 provided between lower surface 122 of housing 120 of battery cell 100 and cooling plate 220 is located in recess 222 of cooling plate 220 and is therefore facilitated to be deformed, with the result that size tolerance in the thickness direction (Z axis direction) can be absorbed at the time of assembling the battery module. Also, the thickness of heat conduction member 300 can be suppressed from being too thick on protrusion 221 of cooling plate 220. As a result, the battery module can be downsized and heat conduction from battery cell 100 to cooling plate 220 can be promoted.

Next, modifications of the shapes of protrusions 221 and recesses 222 of cooling plate 220 will be described with reference to FIGS. 7 to 11.

Figure 7:
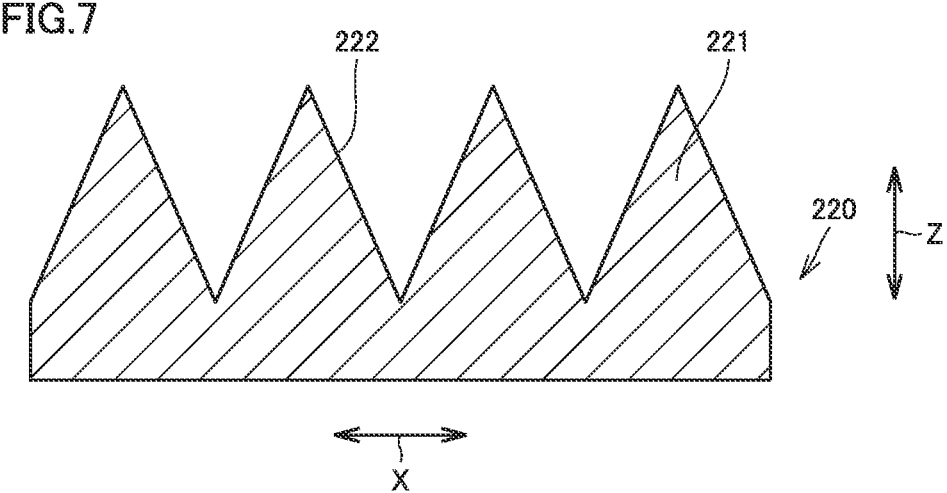
Figure 8:
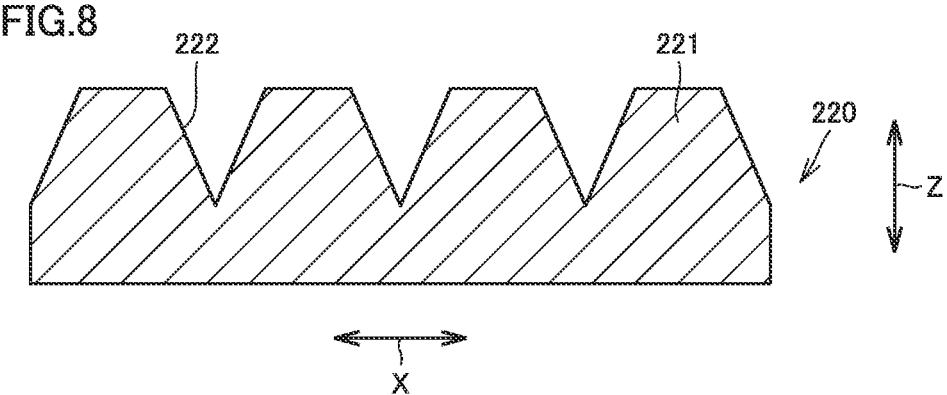
Figure 9:
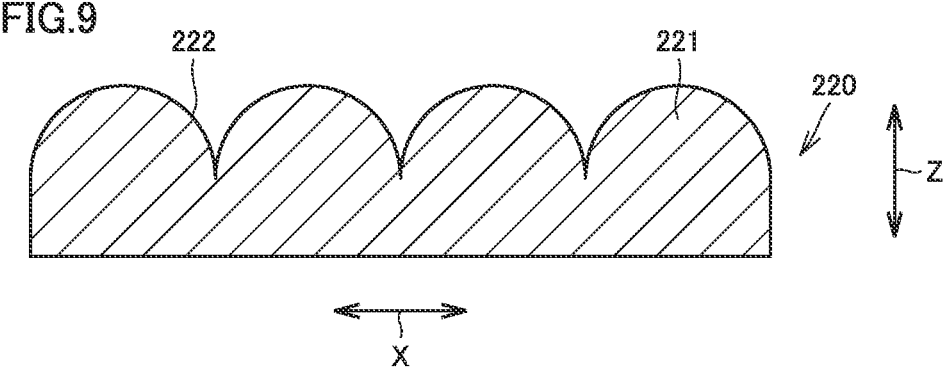

Although each of protrusions 221 and recesses 222 has a rectangular cross sectional shape in the above-described example of FIGS. 4 and 5, each of protrusions 221 and recesses 222 may have a triangular cross sectional shape as in the modification of FIG. 7. Further, each of protrusions 221 and recesses 222 may have a trapezoidal cross sectional shape as in the modification of FIG. 8, and each of protrusions 221 and recesses 222 may have a semicircular cross sectional shape as in the modification of FIG. 9.

Figure 10:
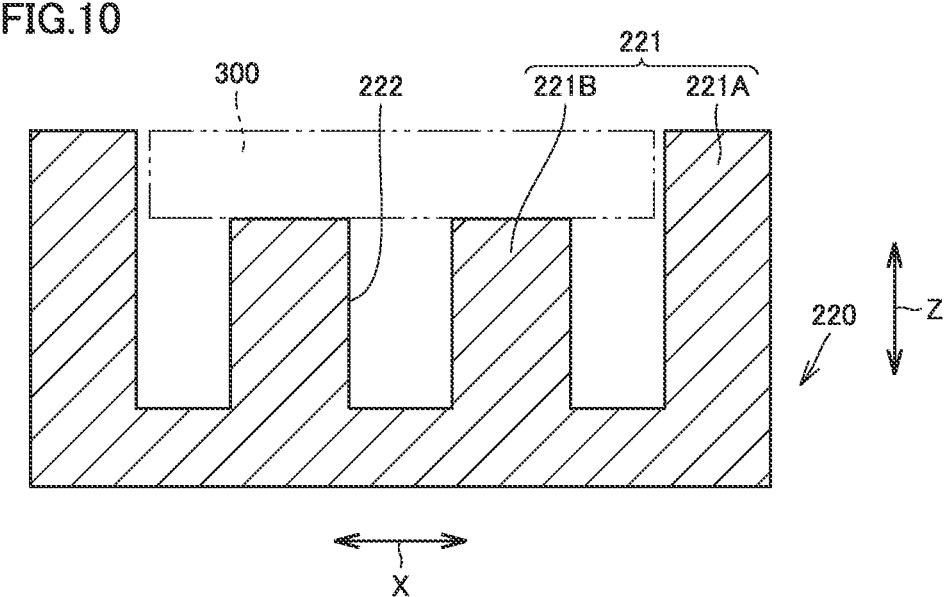
Figure 11:
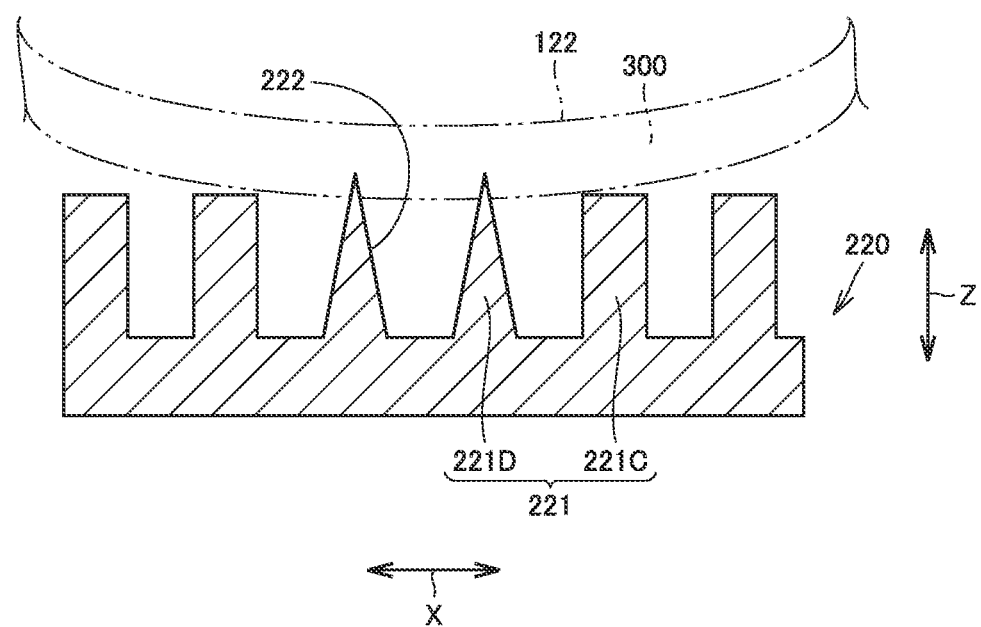

Further, the heights of parts of protrusions 221 may be different as in the modification of FIG. 10, or the shapes of parts of protrusions 221 and recesses 222 may be different as in the modification of FIG. 11.

In the example of FIG. 10, the height of a protrusion 221A located on the end portion side in the X axis direction is relatively high, and the height of a protrusion 221B located at the center side in the X axis direction is relatively low. As shown in FIG. 10, by disposing heat conduction member 300 on protrusion 221B on the center side, heat conduction member 300 can be positioned by protrusion 221A on the end portion side. As a result, positional displacement of heat conduction member 300 can be suppressed.

In the example of FIG. 11, a protrusion 221C located on the end portion side in the X axis direction has a rectangular cross sectional shape, and a protrusion 221D located on the center side in the X axis direction has a triangular cross sectional shape. As shown in FIG. 11, lower surface 122 of housing 120 of battery cell 100 is greatly deformed (expanded) on the center side. On the other hand, by sharpening the tip of protrusion 221D located on the center side, heat conduction member 300 compressed between lower surface 122 and protrusion 221D can be readily deformed. In this way, cooling plate 220 is provided which is facilitated to deal with the expanded shape of housing 120 of battery cell 100.

Although the embodiments of the present invention have been described and illustrated in detail, it is clearly understood that the same is by way of illustration and example only and is not to be taken by way of limitation, the scope of the present invention being interpreted by the terms of the appended claims. The scope of the present invention is defined by the terms of the claims, and is intended to include any modifications within the scope and meaning equivalent to the terms of the claims.

What is claimed is:

1. A battery module comprising:
    a plurality of battery cells each including a bottom surface, the plurality of battery cells being arranged in a first direction;
    a cooling plate facing the bottom surface of each of the plurality of battery cells; and
    a heat conduction member provided between each of the plurality of battery cells and the cooling plate, wherein
    the cooling plate has a protrusion and a recess at a portion facing the bottom surface of each of the plurality of battery cells,
    the heat conduction member is sandwiched between the protrusion of the cooling plate and the bottom surface of each of the plurality of battery cells, and is provided to be located in the recess of the cooling plate, and
    the heat conduction member is located in the recess with a space being left in the recess.

2. The battery module according to claim 1, wherein the heat conduction member is composed of a sheet member having elasticity.

3. The battery module according to claim 1, wherein the heat conduction member is composed of a curable type heat-conductive adhesive material.

4. The battery module according to claim 1, wherein
    the heat conduction member is composed of a sheet member having elasticity, and
    the heat conduction member is composed of a curable type heat-conductive adhesive material.

5. The battery module according to claim 1, wherein each of the protrusion and the recess of the cooling plate has a portion extending along the first direction.

6. The battery module according to claim 1, wherein the heat conduction member is composed of a sheet member having elasticity, and
    each of the protrusion and the recess of the cooling plate has a portion extending along the first direction.

7. The battery module according to claim 1, wherein
    the heat conduction member is composed of a curable type heat-conductive adhesive material, and
    each of the protrusion and the recess of the cooling plate has a portion extending along the first direction.

8. The battery module according to claim 1, wherein the cooling plate has a coolant path, and each of the protrusion and the recess has a portion extending in parallel with the coolant path.

9. The battery module according to claim 1, wherein
    the heat conduction member is composed of a sheet member having elasticity, and the cooling plate has a coolant path, and each of the protrusion and the recess has a portion extending in parallel with the coolant path.

10. The battery module according to claim 1, wherein the heat conduction member is composed of a curable type heat-conductive adhesive material, and the cooling plate has a coolant path, and each of the protrusion and the recess has a portion extending in parallel with the coolant path.

11. The battery module according to claim 1, wherein each of the protrusion and the recess of the cooling plate has a portion extending along the first direction, and the cooling plate has a coolant path, and each of the protrusion and the recess has a portion extending in parallel with the coolant path.

12. The battery module according to claim 1, wherein the cooling plate is composed of an extruded material.

13. The battery module according to claim 1, wherein each of the battery cells is a prismatic secondary battery cell.

* * * * *